(12) United States Patent
Pihur et al.

(10) Patent No.: US 12,380,722 B2
(45) Date of Patent: Aug. 5, 2025

(54) ON-DEVICE TWO STEP APPROXIMATE STRING MATCHING

(71) Applicant: Snap Inc., Santa Monica, CA (US)

(72) Inventors: Vasyl Pihur, Santa Monica, CA (US); Scott Thompson, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 109 days.

(21) Appl. No.: 17/563,848

(22) Filed: Dec. 28, 2021

(65) Prior Publication Data

US 2023/0206669 A1 Jun. 29, 2023

(51) Int. Cl.
*G06V 30/19* (2022.01)
*G06V 30/196* (2022.01)

(52) U.S. Cl.
CPC .... *G06V 30/1983* (2022.01); *G06V 30/19113* (2022.01); *G06V 30/19167* (2022.01)

(58) Field of Classification Search
None
See application file for complete search history.

(56) References Cited

U.S. PATENT DOCUMENTS

| | | | |
|---|---|---|---|
| 5,532,694 A * | 7/1996 | Mayers | H03M 7/46 341/67 |
| 6,173,298 B1 | 1/2001 | Smadja | |
| 8,065,311 B2 | 11/2011 | Wang et al. | |
| 8,166,029 B2 * | 4/2012 | Park | G06F 16/78 707/732 |
| 8,266,169 B2 * | 9/2012 | Bobrow | G06F 16/3344 707/759 |
| 8,768,935 B2 | 7/2014 | Raemy et al. | |
| 8,930,399 B1 * | 1/2015 | Das | G06F 16/90324 707/759 |
| 9,411,800 B2 | 8/2016 | Morin et al. | |
| 9,465,792 B2 | 10/2016 | Jifroodian-haghighi et al. | |
| 9,600,542 B2 * | 3/2017 | Mueller | G06F 16/22 |
| 10,102,274 B2 * | 10/2018 | Mittal | G06F 16/3344 |

(Continued)

FOREIGN PATENT DOCUMENTS

| | | |
|---|---|---|
| CN | 118475926 | 8/2024 |
| WO | WO-2023129927 A1 | 7/2023 |

OTHER PUBLICATIONS

"International Application Serial No. PCT/US2022/082427, International Search Report mailed Mar. 14, 2023", 4 pgs.

(Continued)

*Primary Examiner* — Belix M Ortiz Ditren
(74) *Attorney, Agent, or Firm* — Schwegman Lundberg & Woessner, P.A.

(57) ABSTRACT

A personalized preview system to receive a request to access a collection of media items from a user of a user device. Responsive to receiving the request to access the collection of media items, the personalized preview system accesses user profile data associated with the user, wherein the user profile data includes an image. For example, the image may comprise a depiction of a face, wherein the face comprises a set of facial landmarks. Based on the image, the personalized preview system generates one or more media previews based on corresponding media templates and the image, and displays the one or more media previews within a presentation of the collection of media items at a client device of the user.

17 Claims, 6 Drawing Sheets

(56) References Cited

U.S. PATENT DOCUMENTS

| | | | |
|---|---|---|---|
| 10,748,118 B2 | 8/2020 | Fang | |
| 10,762,112 B2 | 9/2020 | Negrea et al. | |
| 10,911,387 B1 | 2/2021 | Al Majid et al. | |
| 10,936,813 B1* | 3/2021 | Gupta | G06F 40/263 |
| 10,970,573 B2 | 4/2021 | Khitrov et al. | |
| 11,030,789 B2 | 6/2021 | Chand et al. | |
| 11,151,317 B1 | 10/2021 | Singh et al. | |
| 11,194,865 B2 | 12/2021 | Singh et al. | |
| 11,195,018 B1 | 12/2021 | Cowburn et al. | |
| 2007/0250501 A1* | 10/2007 | Grubb | G06F 16/325 |
| | | | 707/999.005 |
| 2012/0066214 A1* | 3/2012 | Nelke | G06F 17/10 |
| | | | 707/723 |
| 2015/0193431 A1* | 7/2015 | Stoytchev | G16B 20/20 |
| | | | 704/9 |
| 2015/0355836 A1* | 12/2015 | Gummadidala | G06F 3/023 |
| | | | 715/773 |
| 2015/0379571 A1* | 12/2015 | Grbovic | G06Q 30/0256 |
| | | | 705/14.54 |
| 2016/0026258 A1* | 1/2016 | Ou | G06F 40/274 |
| | | | 715/773 |
| 2017/0014682 A1* | 1/2017 | Mrowka | G06F 40/205 |
| 2019/0332876 A1* | 10/2019 | Khitrov | G06F 21/32 |
| 2020/0183954 A1 | 6/2020 | Kabra et al. | |
| 2020/0320782 A1 | 10/2020 | Cowburn et al. | |
| 2021/0149936 A1 | 5/2021 | Beller et al. | |
| 2021/0150129 A1 | 5/2021 | Horesh et al. | |
| 2021/0295179 A1* | 9/2021 | Eyal Altman | G06N 5/04 |
| 2021/0304469 A1 | 9/2021 | Heikkinen et al. | |
| 2021/0326526 A1 | 10/2021 | Yee et al. | |
| 2021/0377200 A1 | 12/2021 | Heikkinen et al. | |
| 2021/0406471 A1 | 12/2021 | Kullok et al. | |

OTHER PUBLICATIONS

"International Application Serial No. PCT/US2022/082427, Written Opinion mailed Mar. 14, 2023", 7 pgs.

Cao, Jinkun, et al., "A Novel Fuzzy Search Approach over Encrypted Data with Improved Accuracy and Efficiency", arxiv.org, Cornell University Library, 201 Olin Library Cornell University Ithaca, NY 14853, (Apr. 27, 2019).

Harren, Matthew, et al., "Complex Queries in DHT-based Peer-to-Peer Networks", Lecture Notes in Computer Science Peer-to-Peer Systems, vol. 2429, [Online]. Retrieved from the Internet: <URL: http://db.cs.berkeley.edu/jmh/iptps02.pdf>, (2002), 1-6.

Jian, Xu, et al., "[Online]. Retrieved from the Internet: <URL: https://aclanthology.org/S12-1075.pdf>", First Joint Conference on Lexical and Computational Semantics (SEM), [Online]. Retrieved from the Internet: <URL: https://aclanthology.org/S12-1075.pdf>, (Jan. 1, 2012), 524-528.

Pihur, Vasyl, et al., "On-device Fuzzy Friend Search at Snapchat", Proceedings of ACM Conference '17, ACM, NY, USA, (2018), 4 pgs.

"International Application Serial No. PCT/US2022/082427, International Preliminary Report on Patentability mailed Jul. 11, 2024", 9 pgs.

* cited by examiner

ON-DEVICE TWO STEP APPROXIMATE STRING MATCHING

BACKGROUND

In computer science, approximate string matching (often colloquially referred to as fuzzy string searching) is the technique of finding strings that match a pattern approximately rather than exactly. The problem of approximate string matching is typically divided into two sub-problems: finding approximate substring matches inside a given string and finding dictionary strings that match the pattern approximately.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
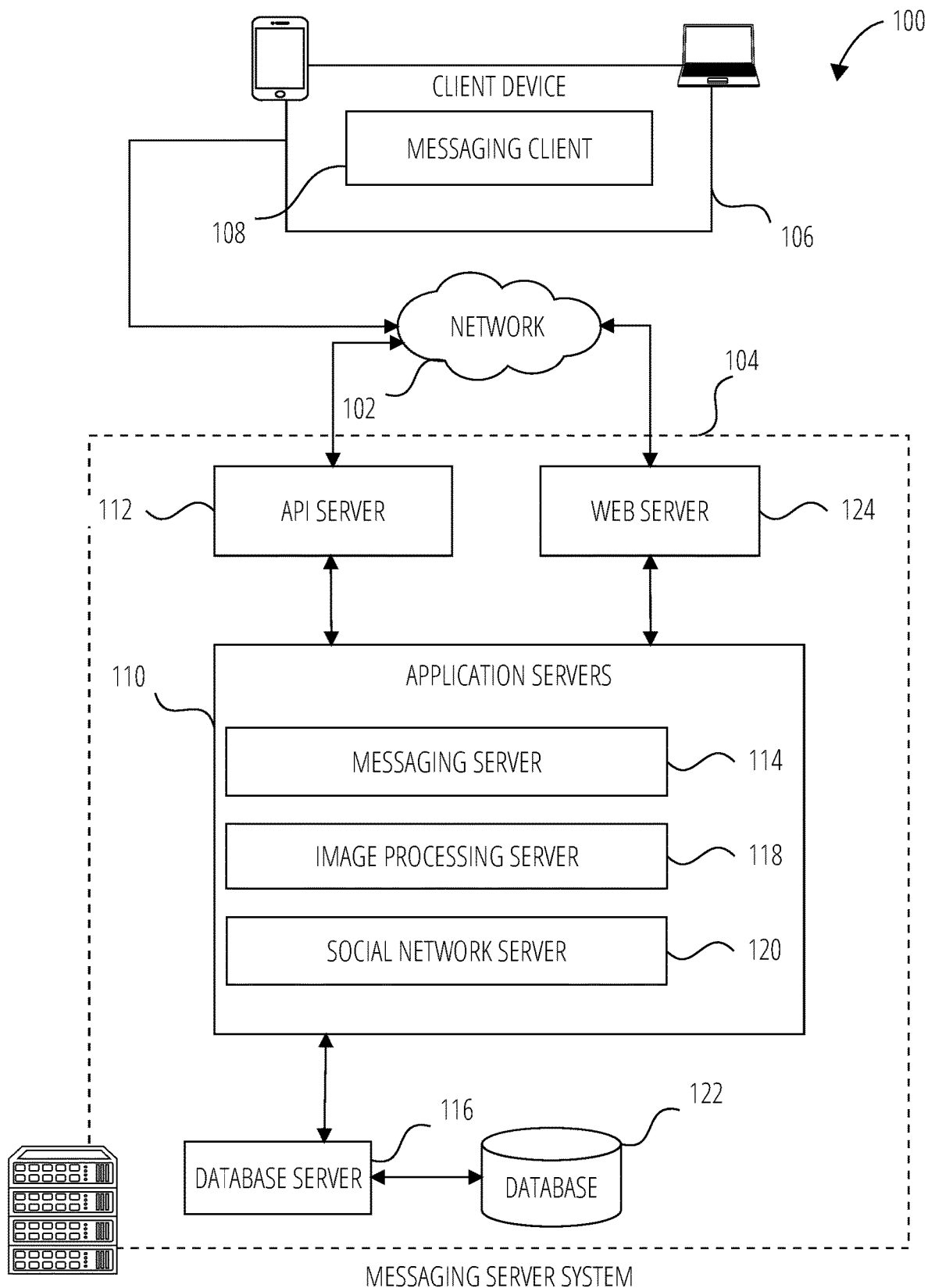
FIG. 1 is a diagrammatic representation of a networked environment in which the present disclosure may be deployed, in accordance with some examples.

As discussed above, fuzzy string searching is the technique of finding strings that match a pattern approximately rather than exactly. In the context of a social media platform, a majority of search queries are typically targeted at identifying users registered within the platform. While existing fuzzy search techniques provide a basic level of functionality in identifying relevant users based on an approximate text string, an issue is implementing such techniques on resource-constrained devices, and in an environment where typographical errors are prevalent. Accordingly, the disclosed system seeks to provide a technical solution to the above-mentioned problem, wherein a fuzzy search may be implemented at a user device despite existing resource limitations.

Disclosed system provides systems and methods for performing on-device, two-step approximate string matching. According to certain example embodiments, a fuzzy search system may perform operations that comprise: receiving a query of a corpus of text strings from a client device, the query comprising a string of characters; generating one or more bigrams based on the string of characters of the query; assigning weights to each bigram among the one or more bigrams; generating a hash-map that comprises a set of values and a key, the set of values including the weights of the one or more bigrams, and the key comprising the one or more bigrams; determining a bigram distance between each of the one or more bigrams within the hash-map and at least a bigram of a text string from the corpus of text strings; selecting the text string from the corpus of text strings based on the bigram distance between each of the one or more bigrams within the hash-map and the bigram of the text string; and causing display of a presentation of a set of search results at the client device, the presentation of the set of search results including at least the text string.

According to certain example embodiments, prior to generating the one or more bigrams based on the string of characters from the query, the fuzzy search system may apply a modification to the string of characters. For example, the system may prepend the text string with an empty " " character (i.e., a space), so that prefix matches rank higher than simple substring matches from the middle of the string. Additionally, initials based on the string may be appended to the end of the original string with a space separator. Consider the following illustrative examples:

'abc'→'abc'
'abc 123'→'abc 123 a1'
'mike petterson jr'→'mike petterson jr mp'

In some embodiments, the bigrams generated by the fuzzy system may include skip bigrams. In the field of computational linguistics, in particular language modeling, skip-grams are a generalization of n-grams in which the components (typically words) need not be consecutive in the text under consideration, but may leave gaps that are skipped over. Instead of operating in the string character space, as is commonly done for most fuzzy string comparison algorithms, the disclosed system may instead compute a distance between two strings that is based on skip bigrams. For example, the string "abc" has two bigrams, "ab" and "bc." These can be thought of as 0-skip bigrams, as no characters between the first and second characters were skipped. This same string also has a 1-skip bigram "ac" that skips the character "b." No higher order skip bigrams are present because of the string length.

There are at least two desirable properties of the skip-bigrams for purposes of conducting an on-device fuzzy search. The first one is that the cardinality of all possible skip-bigrams does not depend on the skip order, as its size is still the number of all possible characters squared, and is relatively small in practice, since most character combinations are not observed in a limited corpus. 1-skip bigram is roughly equivalent to a trigram, yet has this second desirable property of being "fuzzy," meaning that its second character can be arbitrary. Higher order skip-bigrams allow for even more fuzziness.

Not tracking the position of bigrams allows for significant gains in efficiency, while at the same time ability to accommodate character insertions and deletions. A drawback resulting from this flexibility is a second, more expansive, computation to validate the results. The system may however, retain partial information on the skip-bigram order which is used in the distance computation as will be described below.

Accordingly, as discussed above, for each string considered (as well as for the query string), prior to generating the skip bigrams, the system may prepend the string with an empty character so that prefix matches are ranked higher than simple sub string matches from the middle of the string. In addition, since a large portion of usernames have a display name in the form of "first_name last_name," the system may enable users to conduct search based on initials by appending initials generated based on the string to the end of the original string with a space separator.

According to certain embodiments, subsequent to generating the one or more bigrams, the fuzzy search system may assign a weight to each of the one or more skip bigrams, wherein the weight may be represented as $\lambda^k$, where $\lambda$ is the decay parameter and k is the order of the skip-bigram. In a case when the skip-bigram is present more than one order, the maximum order is used. These weights may then be stored in a hash-map where the keys of the hash-map are the skip-bigrams themselves.

For example, the string "abc 12" may be converted to the bigram map depicted in Table 1 below, when $\lambda$=1 2 and k=1.

TABLE 1

Skip-bigrams for the string "abc 12" given $\lambda$ = 12 and k = 1. Notice the additional bigrams containing the empty character in the front and the initials at the end.

| 'a' | 'ab' | 'bc' | 'c' | '1' | '12' | '2' | 'a' | 'a1' | 'b' | 'ac' | 'b' | 'c1' | '2' | '1' | '2a' | '1' |
|---|---|---|---|---|---|---|---|---|---|---|---|---|---|---|---|---|
| 1 | 1 | 1 | 1 | 1 | 1 | 1 | 1 | 1 | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ | $\frac{1}{2}$ |

It may require O(m) time complexity to construct a skip-bigram representation of a string, and in some example embodiments, the fuzzy search system may generate a skip-bigram representation for each string in a corpus over which a search is conducted. For example, in some example embodiments, responsive to receiving a request to add a user as a user connection, the fuzzy search system may automatically generate a skip-bigram representation based on a user identifier associated with the user. Similarly, in some embodiments, the fuzzy search system may routinely access a list of user connections associated with a user account in order to generate and maintain one or more skip-bigram representations of the user identifiers within the list of user connections.

According to certain example embodiments, the fuzzy search system determines a bigram distance between each of the one or more bigrams within the hash-map generated based on the query and at least a bigram of a text string from the corpus of text strings. For example, computing the bigram distance may be represented as:

$$BD(q, s) = \sum_{B_q} (q_i - s_i)^2 - I(q_i = s_i) q_i^2.$$

Where q is the query string, s is the target string, Bq=b1, . . . , bn is the set of skip-bigrams from the query string, Q=q1, . . . , qn are the scores for each skip-bigram from the query string representation, S=s1, . . . , sn are the scores for each skip-bigrams from the target string representation and I (a=b) is the identity function equal to 1 if true and 0 otherwise. In a case when the bigram is not present in the target string, its score si=0.

The provided method results in consistent and efficient distance computations across all target strings, producing a ranked list of results where, the prefix matches may be ranked higher among the list of results, substring matches follow next, and lastly "fuzzy" results at the end of the list.

According to certain embodiments, the fuzzy search system may select a portion of a set of search results to be displayed based on the distance of the portion of the set of search results. For example, if a given query is four characters, even two substitutions, insertions, or deletions may become too far off the intended search request. After all, two substitutions out of four characters is already only a 50% match. Accordingly, in some embodiments, the fuzzy search system may identify a portion of results based on a maximum number of insertions, deletions, or substitutions away from the query term. In some embodiments, the maximum number may be proportional to a number of characters within a text string of the query.

In some embodiments, an asymmetric, "local" Levenshtein metric may be applied to determine a distance computation. In information theory, linguistics, and computer science, the Levenshtein distance is a string metric for measuring the difference between two sequences. The Levenshtein distance between two words is the minimum number of single-character edits (insertions, deletions or substitutions) required to change one word into the other.

$lev(a, b)$  $a, b$  $|a|$  $|b|$ $$lev(a, b) = \begin{cases} |a| & \text{if } |b| = 0, \\ |b| & \text{if } |a| = 0, \\ lev(\text{tail } (a), \text{tail } (b)) & \text{if } a[0] = b[0] \\ 1 + \min \begin{cases} lev(\text{tail } (a), (b)) \\ lev(a, \text{tail } (b)) \\ lev(\text{tail } (a), \text{tail } (b)) \end{cases} & \text{otherwise,} \end{cases}$$

tail $x$ $\begin{matrix} x \\ a\ b \end{matrix}$  $x$  $x[n]$  $n$

In some embodiments as discussed herein, the fuzzy search system may not initialize the first row of the matrix d to 0, . . . , m as typically applied in a Levenshtein distance calculation. This idea is borrowed from the Smith-Waterman algorithm and is generally applicable across all local alignment schemes. Instead of returning d [n,m], the global score of aligning all characters of the query string with all characters with the target string, the fuzzy search system may return the minimum distance indicated by the last row of the matrix, which represents the smallest distance of matching all characters of the query string to an arbitrary sub-sequence of characters in the target string.

In some embodiments, in an offline mode of the client device, the system may pre-compute all skip-bigrams for all target strings within a corpus (i.e., a list of user connections), and save them in hash-maps (i.e., one hash-map per target string).

In some embodiments, responsive to identifying a set of search results, the fuzzy search system causes display of a presentation of the set of search results at the client device, wherein the presentation of the set of search results may be sorted based on one or more sorting criteria that include a distance of each search result from among the set of search results.

Networked Computing Environment

FIG. 1 is a block diagram showing an example messaging system 100 for exchanging data (e.g., messages and associated content) over a network. The messaging system 100 includes multiple instances of a client device 106, each of which hosts a number of applications, including a messaging client 108. Each messaging client 108 is communicatively coupled to other instances of the messaging client 108 and a messaging server system 104 via a network 102 (e.g., the Internet).

A messaging client 108 is able to communicate and exchange data with another messaging client 108 and with the messaging server system 104 via the network 102. The data exchanged between messaging client 108, and between a messaging client 108 and the messaging server system 104, includes functions (e.g., commands to invoke functions) as well as payload data (e.g., text, audio, video or other multimedia data).

The messaging server system 104 provides server-side functionality via the network 102 to a particular messaging client 108. While certain functions of the messaging system 100 are described herein as being performed by either a messaging client 108 or by the messaging server system 104, the location of certain functionality either within the messaging client 108 or the messaging server system 104 may be a design choice. For example, it may be technically preferable to initially deploy certain technology and functionality within the messaging server system 104 but to later migrate this technology and functionality to the messaging client 108 where a client device 106 has sufficient processing capacity.

The messaging server system 104 supports various services and operations that are provided to the messaging client 108. Such operations include transmitting data to, receiving data from, and processing data generated by the messaging client 108. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 108.

Turning now specifically to the messaging server system 104, an Application Program Interface (API) server 112 is coupled to, and provides a programmatic interface to, application servers 110. The application servers 110 are communicatively coupled to a database server 116, which facilitates access to a database 122 that stores data associated with messages processed by the application servers 110. Similarly, a web server 124 is coupled to the application servers 110, and provides web-based interfaces to the application servers 110. To this end, the web server 124 processes incoming network requests over the Hypertext Transfer Protocol (HTTP) and several other related protocols.

The Application Program Interface (API) server 112 receives and transmits message data (e.g., commands and message payloads) between the client device 106 and the application servers 110. Specifically, the Application Program Interface (API) server 112 provides a set of interfaces (e.g., routines and protocols) that can be called or queried by the messaging client 108 in order to invoke functionality of the application servers 110. The Application Program Interface (API) server 112 exposes various functions supported by the application servers 110, including account registration, login functionality, the sending of messages, via the application servers 110, from a particular messaging client 108 to another messaging client 108, the sending of media files (e.g., images or video) from a messaging client 108 to a messaging server 114, and for possible access by another messaging client 108, the settings of a collection of media data (e.g., story), the retrieval of a list of friends of a user of a client device 106, the retrieval of such collections, the retrieval of messages and content, the addition and deletion of entities (e.g., friends) to an entity graph (e.g., a social graph), the location of friends within a social graph, and opening an application event (e.g., relating to the messaging client 108).

The application servers 110 host a number of server applications and subsystems, including for example a messaging server 114, an image processing server 118, and a social network server 120. The messaging server 114 implements a number of message processing technologies and functions, particularly related to the aggregation and other processing of content (e.g., textual and multimedia content) included in messages received from multiple instances of the messaging client 108. As will be described in further detail, the text and media content from multiple sources may be aggregated into collections of content (e.g., called stories or galleries). These collections are then made available to the messaging client 108. Other processor and memory intensive processing of data may also be performed server-side by the messaging server 114, in view of the hardware requirements for such processing.

The application servers 110 also include an image processing server 118 that is dedicated to performing various image processing operations, typically with respect to images or video within the payload of a message sent from or received at the messaging server 114.

The social network server 120 supports various social networking functions and services and makes these functions and services available to the messaging server 114. Examples of functions and services supported by the social network server 120 include the identification of other users of the messaging system 100 with which a particular user has relationships or is "following," and also the identification of other entities and interests of a particular user.

System Architecture

Figure 2:
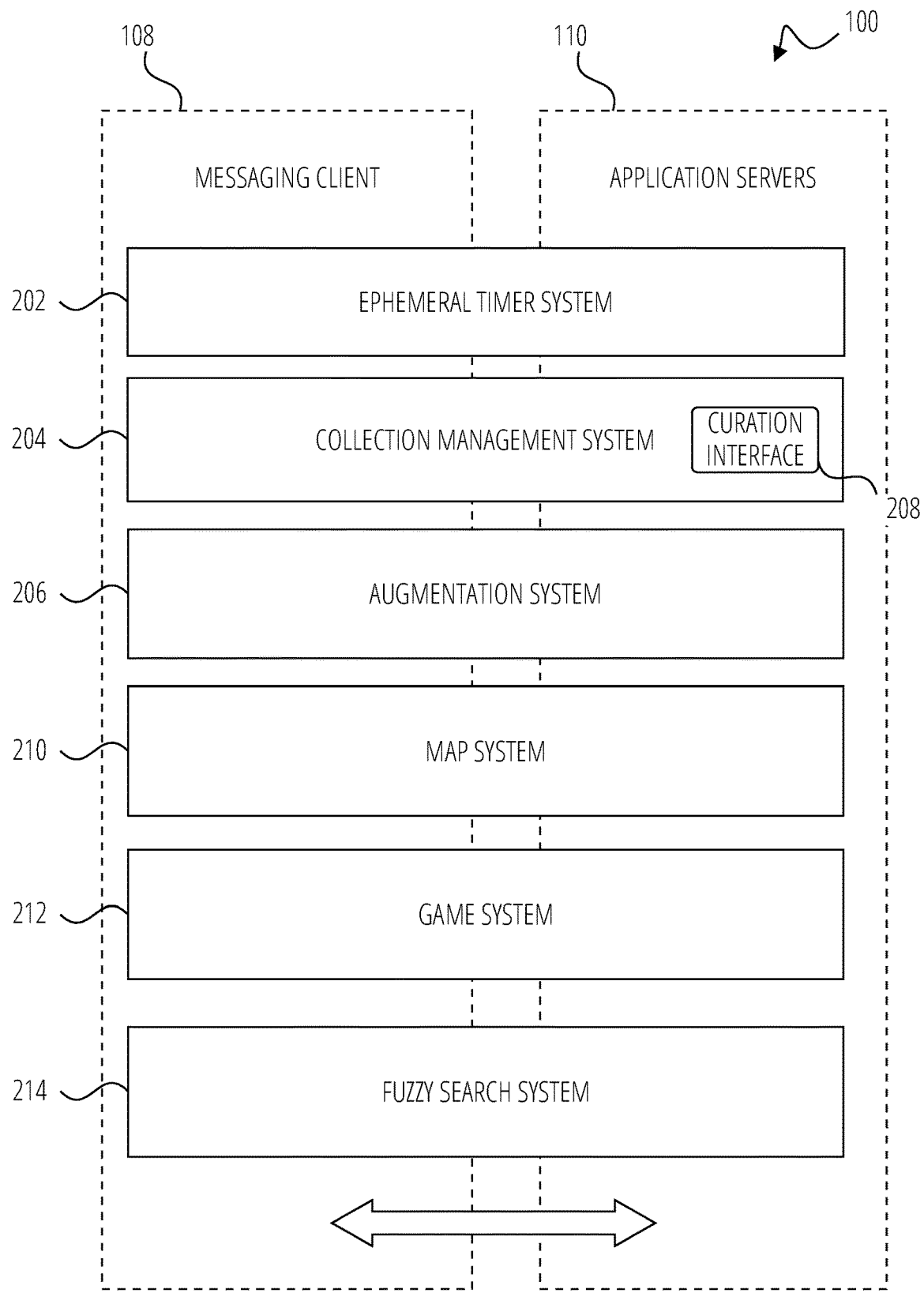
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 108 and the application servers 110. The messaging system 100 embodies a number of subsystems, which are supported on the client-side by the messaging client 108 and on the sever-side by the application servers 110. These subsystems include, for example, an ephemeral timer system 202, a collection management system 204, an augmentation system 206, a map system 210, a game system 212, and a fuzzy search system 214.

The ephemeral timer system 202 is responsible for enforcing the temporary or time-limited access to content by the messaging client 108 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 108. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story."

Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 108 based on a geolocation of the client device 106. In another example, the augmentation system 206 operatively supplies a media overlay to the messaging client 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text or image that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the augmentation system 206 uses the geolocation of the client device 106 to identify a media overlay that includes the name of a merchant at the geolocation of the client device 106. The media overlay may include other indicia associated with the merchant. The media overlays may be stored in the database 122 and accessed through the database server 116.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 210 provides various geographic location functions, and supports the presentation of map-based media content and messages by the messaging client 108. For example, the map system 210 enables the display of user icons or avatars (e.g., stored in profile data 316 (deleted)) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 108. A user can furthermore share his or her location and status information (e.g., using an appropriate status avatar) with other users of the messaging system 100 via the messaging client 108, with this location and status information being similarly displayed within the context of a map interface of the messaging client 108 to selected users.

The game system 212 provides various gaming functions within the context of the messaging client 108. The messaging client 108 provides a game interface providing a list of available games that can be launched by a user within the context of the messaging client 108, and played with other users of the messaging system 100. The messaging system 100 further enables a particular user to invite other users to participate in the play of a specific game, by issuing invitations to such other users from the messaging client 108. The messaging client 108 also supports both the voice and text messaging (e.g., chats) within the context of gameplay, provides a leaderboard for the games, and also supports the provision of in-game rewards (e.g., coins and items).

The fuzzy search system 214 provides functions related to performing approximate string matching, and presenting a set of search results, according to certain example embodiments.

Figure 3:
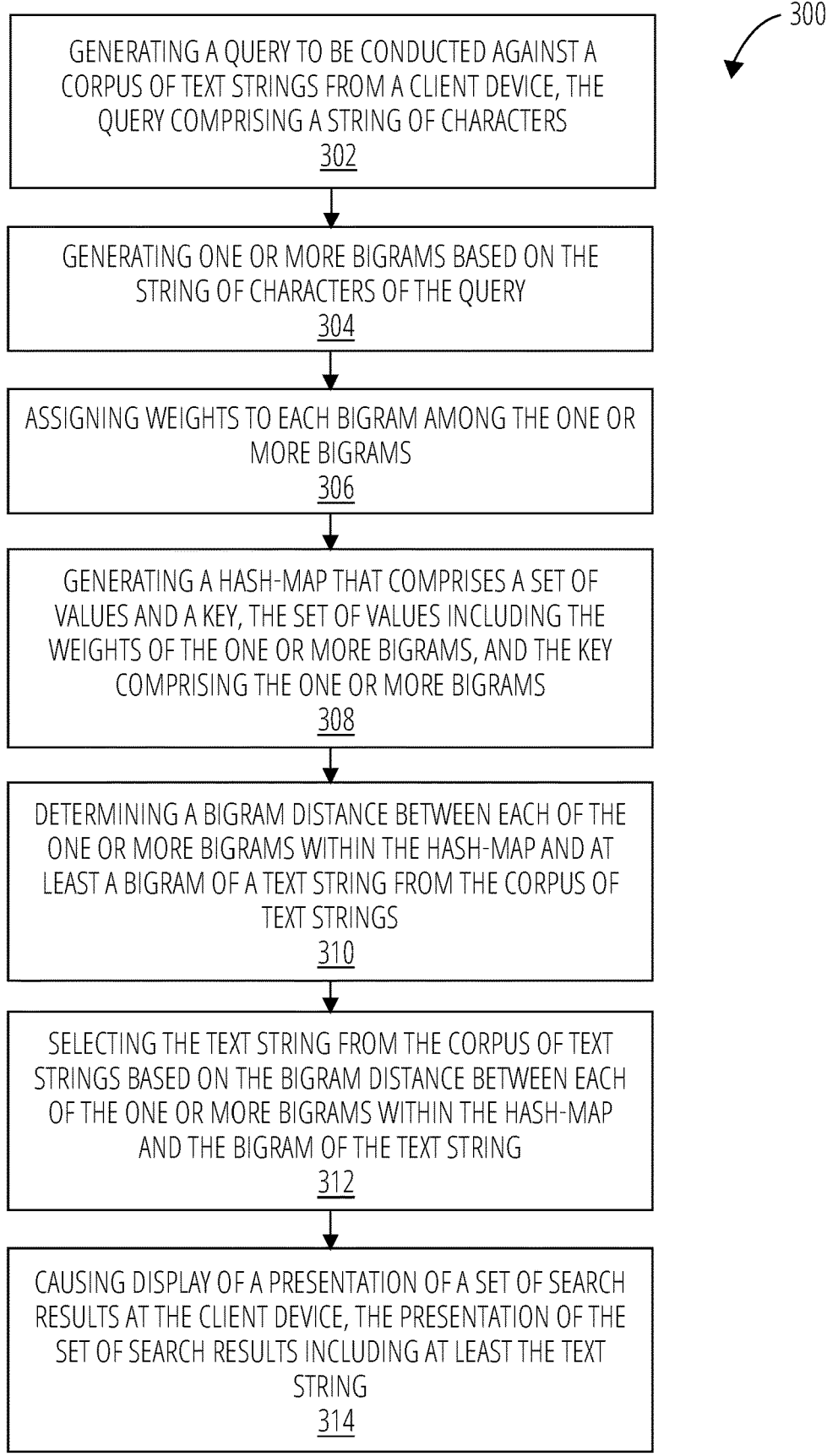
FIG. 3 is a flowchart depicting a method 300 for performing approximate string matching, in accordance with one embodiment.

FIG. 3 is a flowchart illustrating operations of a fuzzy search system 214 in performing a method 300 for performing approximate string matching, in accordance with one embodiment. Operations of the method 300 may be performed by one or more subsystems of the messaging system 100 described above with respect to FIG. 2, such as the fuzzy search system 214. As shown in FIG. 3, the method 300 includes one or more operations, 302, 304, 306, 308, 310, 312, and 314.

At operation 302, the fuzzy search system 214 generates a query to be conducted against a corpus of text strings from a client device 106, wherein the query comprises a string of characters. For example, a user of the client device 106 may provide an input into a search request field displayed within a GUI presented at the client device 106, wherein the input comprises a text string. Responsive to receiving the input, the fuzzy search system 214 generates the query.

In some embodiments, generating the query may include curating and uploading the corpus of text strings to the client device 106. For example, responsive to receiving a user input that includes a string of characters, the system may generate a query to be conducted against a corpus of text strings. Upon generating the query, the system may access the corpus of text strings, and upload the corpus of text strings to the client device 106, such that the operations of the method 300 may be performed locally by the client device 106.

At operation 304, one or more bigrams are generated based on the string of characters of the query. In some embodiments, the fuzzy search system 214 may modify the string of characters prior to generating the one or more bigrams based on the string of characters from the query. For example, the fuzzy search system 214 may prepend the text string with an empty " " character (i.e., a space), so that prefix matches rank higher than simple substring matches from the middle of the string. Additionally, initials based on the string may be appended to the end of the original string with a space separator.

At operation 306, weights are assigned to each bigram from among the one or more bigrams generated based on the string of characters. For example, the weight of each bigram may be represented as $\lambda^k$, where $\lambda$ is the decay parameter and k is the order of the skip-bigram. In a case when the skip-bigram is present more than one order, the maximum order is used. At operation 308, the weights may be stored in a hash-map where the keys of the hash-map are the skip-bigrams themselves.

In some embodiments, the weights may be determined based on one or more factors that include a keyboard type associated with the client device 106. For example, characters that are adjacent to characters found within the string of characters of the query on a keyboard of the client device 106 may be weighted more highly that characters that are distance from the characters of the query on the keyboard.

At operation 310, the fuzzy search system 214 determines bigram distances between each of the one or more bigrams within the hash-map, and one or more bigrams of a hash-map (i.e., a "corpus hash-map) generated based on a corpus of text strings. For example, the corpus hash-map may be generated based on user identifiers from a list of user connections associated with the user of the client device 106.

At operation 312, one or more text strings are selected from a corpus of text strings (i.e., a list of user connections associated with the user of the client device 106) based on the bigram distances of each of the one or more text strings. For example, in some embodiments, the fuzzy search system 214 may select one or more text strings to be displayed as a set of search results at the client device 106 based on the corresponding bigram distance. In some embodiments, the fuzzy search system 214 may select the one or more text strings based on the one or more text strings being within a threshold bigram distance of the original query. The threshold bigram distance may be a predefined maximum threshold, or in some embodiments may be proportional to a length/number of characters of the string of characters from the query. For example, if a given query is four characters, even two substitutions, insertions, or deletions may become too far off the intended search request. After all, two substitutions out of four characters is already only a 50% match. Accordingly, in some embodiments, the fuzzy search system may identify a portion of results based on a maximum number of insertions, deletions, or substitutions away from the query term.

In some embodiments, the maximum number may be proportional to a number of characters within a text string of the query. For example, an asymmetric, local Levenshtein metric may be applied to determine a distance computation.

At operation 314, the fuzzy search system 214 causes display of a presentation of the one or more selected text strings as a set of search results at the client device 106. In some embodiments, the presentation of the set of search results may be sorted based on the bigram distances that correspond with each of the search results among the set of search results.

Machine Architecture

Figure 4:
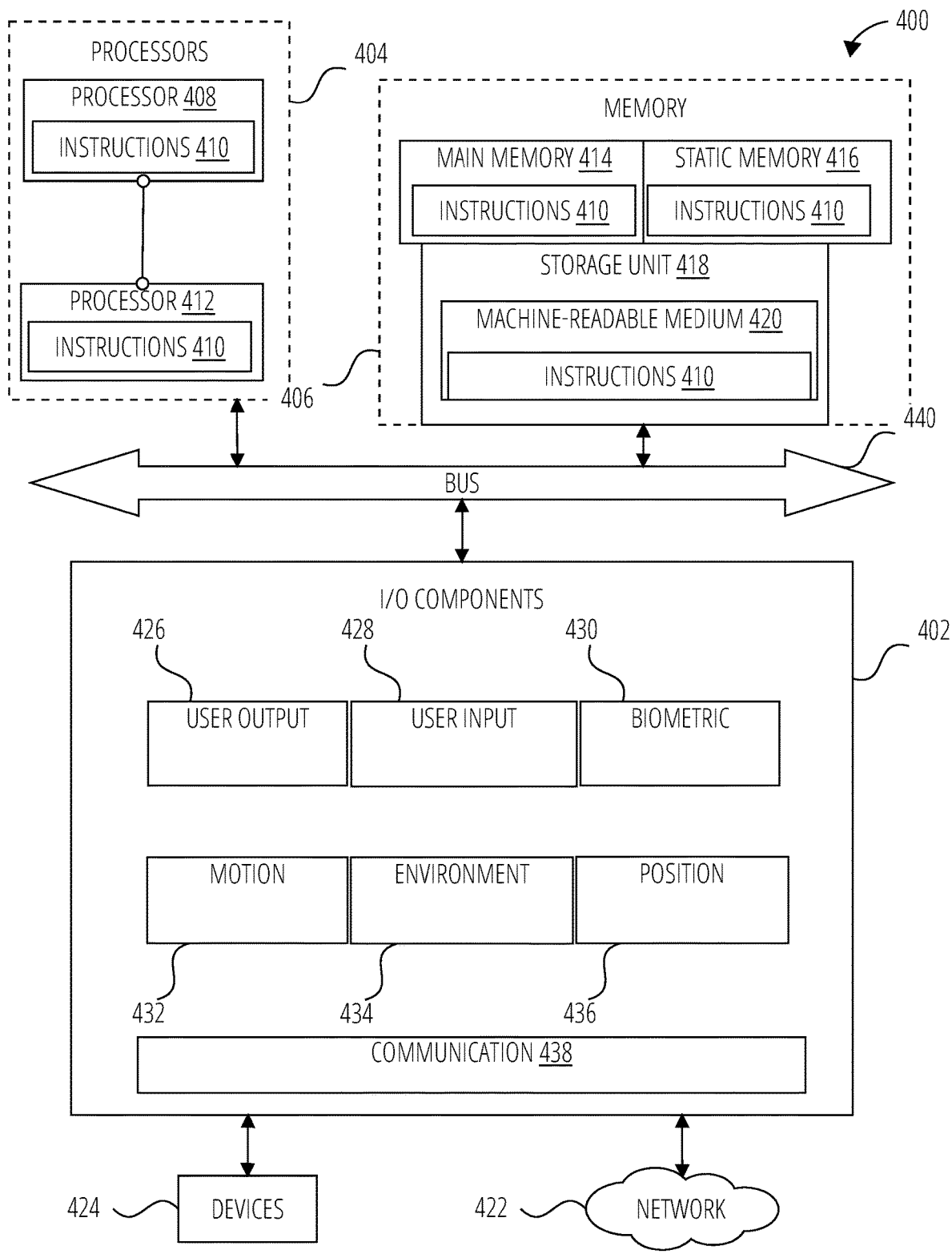
FIG. 4 is a diagrammatic representation of a machine in the form of a computer system within which a set of instructions may be executed for causing the machine to perform any one or more of the methodologies discussed herein, in accordance with some examples.

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the client device 106 or any one of a number of server devices forming part of the messaging server system 104. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 638, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may, for example, be used to capture still images and video of a user of the client device 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
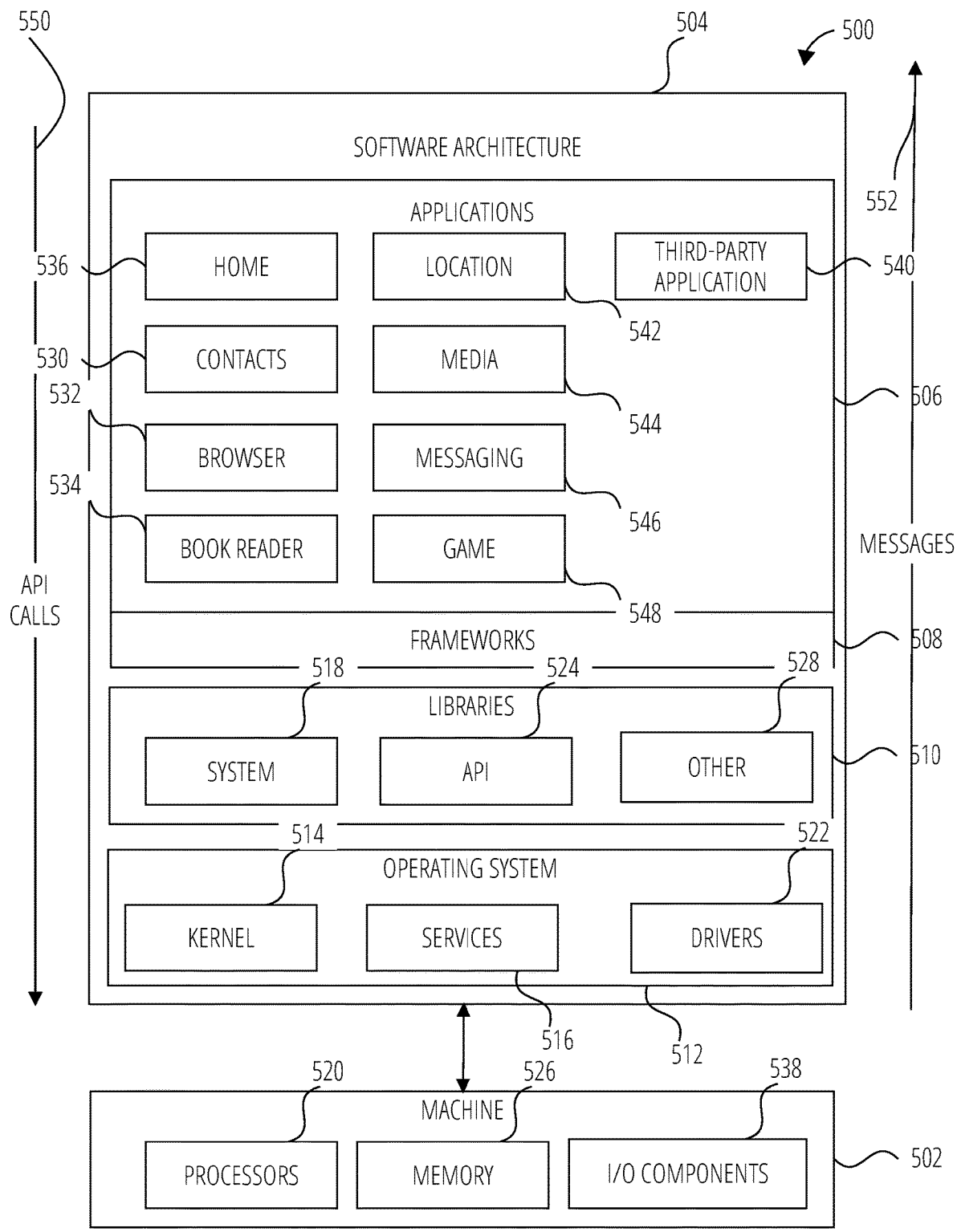
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Processing Components

Figure 6:
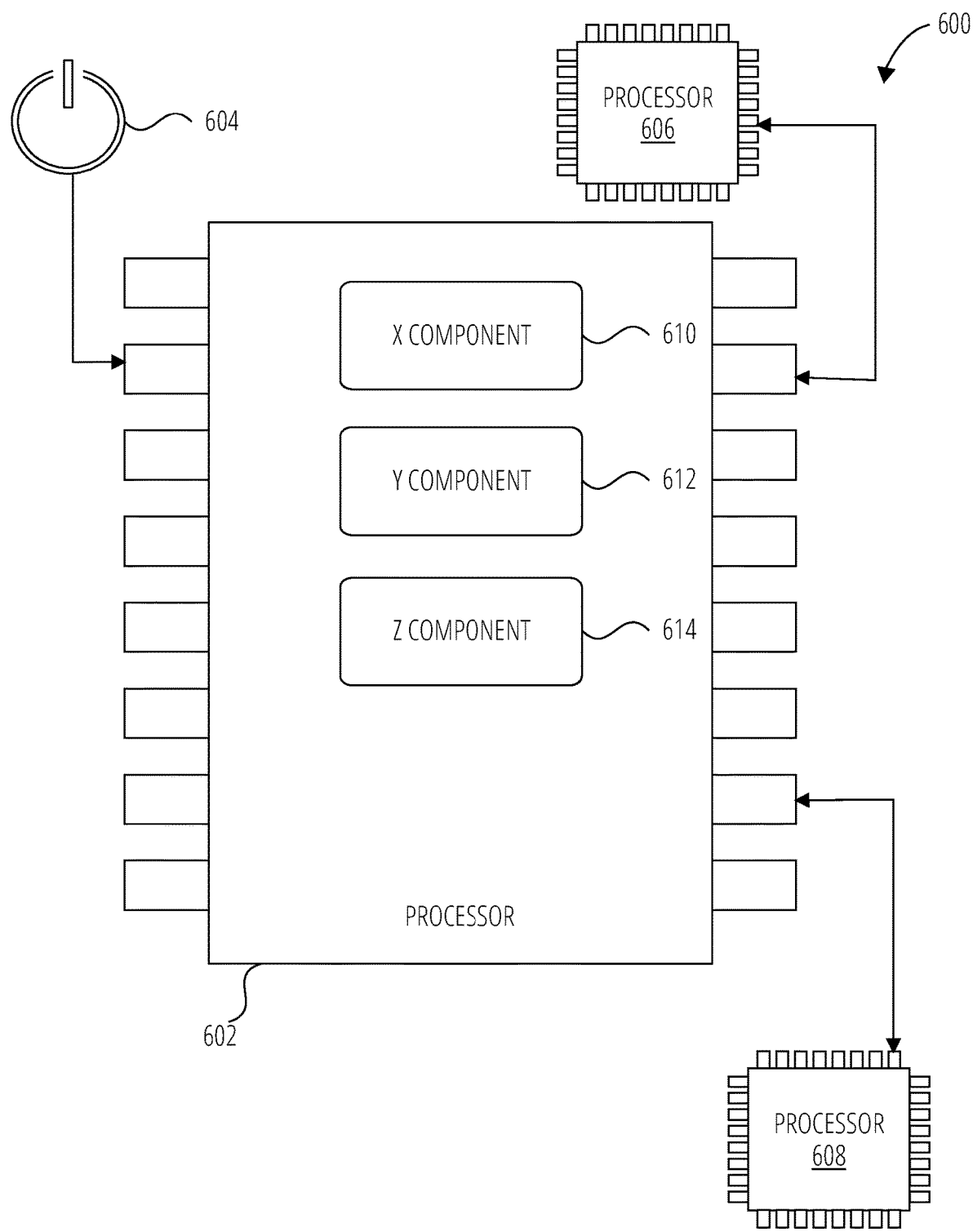
FIG. 6 is a diagrammatic representation of a processing environment, in accordance with some examples.

Turning now to FIG. 6, there is shown a diagrammatic representation of a processing environment 600, which includes a processor 602, a processor 606, and a processor 608 (e.g., a GPU, CPU or combination thereof).

The processor 602 is shown to be coupled to a power source 604, and to include (either permanently configured or temporarily instantiated) modules, namely an X component 610, a Y component 612, and a Z component 614. The X component 610 operationally generates a query based on a string of characters received as a user input, the Y component 612 operationally generates performs approximate string matching based on the string of characters, and the Z component 614 operationally displays an identified set of text strings as a set of search results. As illustrated, the processor 602 is communicatively coupled to both the processor 606 and the processor 608.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
receiving, from a client device, a query against a corpus of text strings, the query comprising a string of characters received via a keyboard displayed within a graphical user interface (GUI) of the client device;
responsive to the receiving the query against the corpus of text strings, causing the client device to perform operations at the client device that include:
applying a modification to the string of characters;
generating one or more bigrams based on the string of characters that include the modification;
assigning weights to each bigram among the one or more bigrams based on a keyboard type of the keyboard displayed within the GUI of the client device, and an order of the one or more bigrams;
generating a hash-map that comprises a set of values and a key, the set of values including the weights of the one or more bigrams, and the key comprising the one or more bigrams;
determining a bigram distance between each of the one or more bigrams within the hash-map and at least a bigram of a text string from the corpus of text strings;
selecting the text string from the corpus of text strings based on the bigram distance between each of the one or more bigrams within the hash-map and the bigram of the text string; and
causing display of a presentation of a set of search results at the client device, the presentation of the set of search results including at least the text string.

2. The method of claim 1, wherein the modifying the string of characters further comprises:
adding a space prior to the string of characters.

3. The method of claim 1, wherein the one or more bigrams include a skip bigram.

4. The method of claim 1, wherein the selecting the text string from the corpus of text strings based on the bigram distance between each of the one or more bigrams within the hash-map and the bigram of the text string further comprises:
performing a comparison of the bigram distance with a threshold value; and
selecting the text string based on the comparison.

5. The method of claim 1, wherein the assigning weights to each bigram among the one or more bigrams is based on one or more factors that include a keyboard type associated with the client device.

6. The method of claim 1, wherein the causing display of the presentation of the set of search results further comprises:
determining a ranking of the text string among the set of search results based on at least the bigram distance; and
displaying the text string among the presentation of the set of search results based on the ranking.

7. The method of claim 1, wherein the receiving the query of the corpus of text strings further comprises:
receiving a user input that comprises the string of characters;
generating the query based on the string of characters; and
uploading the corpus of text string to the client device.

8. A system comprising:
a memory; and
at least one hardware processor coupled to the memory and comprising instructions that causes the system to perform operations comprising:
receiving, from a client device, a query against a corpus of text strings, the query comprising a string of characters received via a keyboard displayed within a graphical user interface (GUI) of the client device;
responsive to the receiving the query against the corpus of text strings, causing the client device to perform operations at the client device that include:
applying a modification to the string of characters;
generating one or more bigrams based on the string of characters that include the modification;

assigning weights to each bigram among the one or more bigrams based on a keyboard type of the keyboard displayed within the GUI of the client device, and an order of the one or more bigrams;

generating a hash-map that comprises a set of values and a key, the set of values including the weights of the one or more bigrams, and the key comprising the one or more bigrams;

determining a bigram distance between each of the one or more bigrams within the hash-map and at least a bigram of a text string from the corpus of text strings;

selecting the text string from the corpus of text strings based on the bigram distance between each of the one or more bigrams within the hash-map and the bigram of the text string; and causing display of a presentation of a set of search results at the client device, the presentation of the set of search results including at least the text string.

9. The system of claim 8, wherein the modifying the string of characters further comprises:

adding a space prior to the string of characters.

10. The system of claim 8, wherein the one or more bigrams include a skip bigram.

11. The system of claim 8, wherein the selecting the text string from the corpus of text strings based on the bigram distance between each of the one or more bigrams within the hash-map and the bigram of the text string further comprises:

performing a comparison of the bigram distance with a threshold value; and selecting the text string based on the comparison.

12. The system of claim 8, wherein the assigning weights to each bigram among the one or more bigrams is based on one or more factors that include a keyboard type associated with the client device.

13. The system of claim 8, wherein the causing display of the presentation of the set of search results further comprises:

determining a ranking of the text string among the set of search results based on at least the bigram distance; and displaying the text string among the presentation of the set of search results based on the ranking.

14. A non-transitory machine-readable storage medium comprising instructions that, when executed by one or more processors of a machine, cause the machine to perform operations comprising:

receiving, from a client device, a query against a corpus of text strings, the query comprising a string of characters received via a keyboard displayed within a graphical user interface (GUI) of the client device;

responsive to the receiving the query against the corpus of text strings, causing the client device to perform operations at the client device that include:

applying a modification to the string of characters;

generating one or more bigrams based on the string of characters that include the modification;

assigning weights to each bigram among the one or more bigrams based on a keyboard type of the keyboard displayed within the GUI of the client device, and an order of the one or more bigrams;

generating a hash-map that comprises a set of values and a key, the set of values including the weights of the one or more bigrams, and the key comprising the one or more bigrams;

determining a bigram distance between each of the one or more bigrams within the hash-map and at least a bigram of a text string from the corpus of text strings;

selecting the text string from the corpus of text strings based on the bigram distance between each of the one or more bigrams within the hash-map and the bigram of the text string; and causing display of a presentation of a set of search results at the client device, the presentation of the set of search results including at least the text string.

15. The non-transitory machine-readable storage medium of claim 14, wherein the modifying the string of characters further comprises:

adding a space prior to the string of characters.

16. The non-transitory machine-readable storage medium of claim 14, wherein the one or more bigrams include a skip bigram.

17. The non-transitory machine-readable storage medium of claim 14, wherein the selecting the text string from the corpus of text strings based on the bigram distance between each of the one or more bigrams within the hash-map and the bigram of the text string further comprises:

performing a comparison of the bigram distance with a threshold value; and selecting the text string based on the comparison.

\* \* \* \* \*